(12) United States Patent
Parco et al.

(10) Patent No.: US 8,965,731 B2
(45) Date of Patent: Feb. 24, 2015

(54) METHODS AND DEVICES TO DETERMINE A MOBILE DEVICE HOUSING POSITION

(75) Inventors: Adam Louis Parco, Kitchener (CA);
Marc E. Holbein, Kitchener (CA);
Nazih Almalki, Waterloo (CA);
Christopher Harris Snow, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 294 days.

(21) Appl. No.: 13/180,293

(22) Filed: Jul. 11, 2011

(65) Prior Publication Data

US 2013/0018628 A1     Jan. 17, 2013

(51) Int. Cl.
*G06F 15/00*     (2006.01)
*H04M 1/02*      (2006.01)

(52) U.S. Cl.
CPC .......... *H04M 1/0241* (2013.01); *H04M 1/0245* (2013.01)
USPC ...................................... 702/150; 324/207.22

(58) Field of Classification Search
USPC ............ 455/575.1, 575.4, 571.3; 324/207.11, 324/207.24, 207.2, 207.21, 244.235
See application file for complete search history.

(56) References Cited

U.S. PATENT DOCUMENTS

| | | | |
|---|---|---|---|
| 6,060,969 A * | 5/2000 | Hufgard et al. ............... | 335/207 |
| 6,314,183 B1 | 11/2001 | Pehrsson et al. | |
| 6,667,731 B2 * | 12/2003 | Park .............................. | 345/102 |
| 8,560,012 B2 * | 10/2013 | Ohnishi et al. ............. | 455/556.1 |
| 2002/0119802 A1 * | 8/2002 | Hijii ............................... | 455/550 |
| 2004/0019439 A1 * | 1/2004 | El-Ibiary .......................... | 702/57 |
| 2004/0198437 A1 * | 10/2004 | Yamamoto et al. ......... | 455/556.1 |
| 2004/0198477 A1 * | 10/2004 | Jung et al. ................... | 455/575.4 |
| 2005/0020097 A1 * | 1/2005 | Kawahigashi et al. ......... | 439/38 |
| 2005/0079897 A1 * | 4/2005 | Nishijima et al. .......... | 455/575.1 |
| 2005/0208799 A1 | 9/2005 | Oda | |
| 2008/0001598 A1 * | 1/2008 | Koivuaho ..................... | 324/244 |

(Continued)

FOREIGN PATENT DOCUMENTS

| | | |
|---|---|---|
| EP | 1675357 | 6/2006 |
| EP | 2031837 | 3/2009 |
| EP | 2339819 | 6/2011 |

OTHER PUBLICATIONS

Canadian Intellectual Property Office, "Examiner's Report", issued in connection with Canadian Patent Application No. 2,779,241, dated Dec. 12, 2013, (3 pages).

(Continued)

*Primary Examiner* — John Breene
*Assistant Examiner* — Corey Bailey
(74) *Attorney, Agent, or Firm* — Hanley, Flight & Zimmerman, LLC

(57) ABSTRACT

Methods and devices to determine a mobile device housing position are described. An example device disclosed herein includes a housing having a first portion movably coupled to a second portion, the second portion to have a first position, a second position, and at least one intermediate position relative to the first portion, wherein the intermediate position is between the first and second positions; a position detector in the first portion, the position detector to measure a transitional magnetic field when the second portion is in the intermediate position and to measure a second magnetic field; and a processor to determine that the second portion is in the first position or the second position based on the transitional magnetic field and the second magnetic field.

18 Claims, 9 Drawing Sheets

(56) References Cited

U.S. PATENT DOCUMENTS

| | | |
|---|---|---|
| 2008/0036452 A1 | 2/2008 | Hirayama |
| 2008/0066331 A1* | 3/2008 | Brzezinski et al. ............. 33/356 |
| 2009/0239586 A1 | 9/2009 | Boeve et al. |
| 2010/0144405 A1* | 6/2010 | Hakamata et al. ......... 455/575.3 |
| 2010/0210216 A1 | 8/2010 | Westlund |

OTHER PUBLICATIONS

European Patent Office, "Search Report", issued in connection with European patent application No. 11177398.2, dated Oct. 30, 2012, (10 pages).

Canadian Intellectual Property Office, "Notice of Allowance," issued in connection with Application No. 2,779,241, Jul. 31, 2014, 1 page.

* cited by examiner

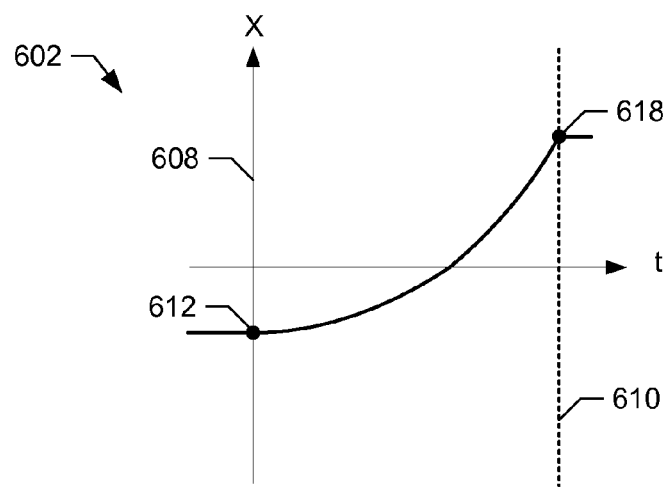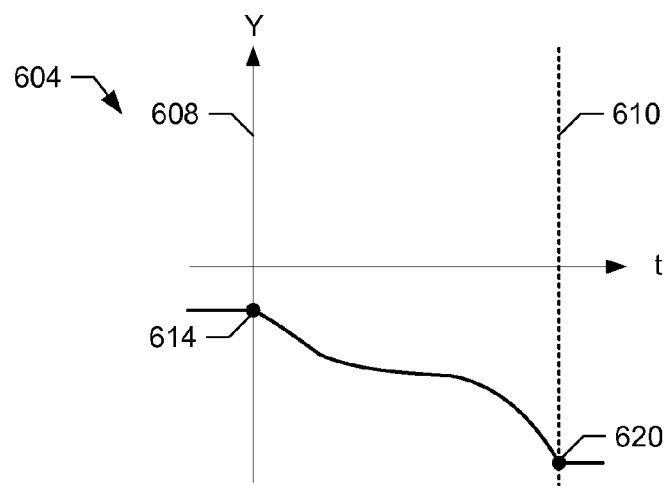
FIG. 6
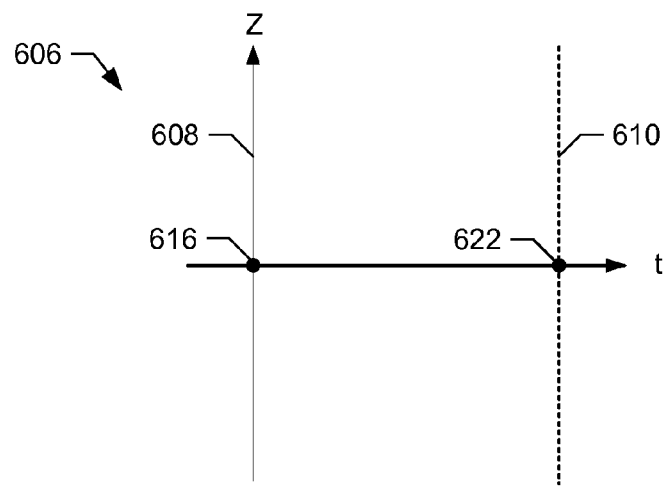

METHODS AND DEVICES TO DETERMINE A MOBILE DEVICE HOUSING POSITION

FIELD OF THE DISCLOSURE

This disclosure relates generally to mobile devices and, more particularly, to methods and devices to determine a mobile device housing position.

BACKGROUND

Mobile communication devices are now offered in different form factors, such as the slider type, the candy bar type, the flip or clamshell type, and the swivel type. Some devices include a combination of these form factors. The slider, the flip, and the swivel types each have multiple positions, where at least one position is a compact position for storage, and at least one position is an extended or open position to facilitate ease of use of the device's features.

BRIEF DESCRIPTION OF THE DRAWINGS

FIG. 6 shows graphs of example directional magnetic field signals detected by an example magnetometer during a change from the first position of the flip-type device of FIG. 3A to the second position of the flip-type device of FIG. 3B.

DETAILED DESCRIPTION

Figure 1:
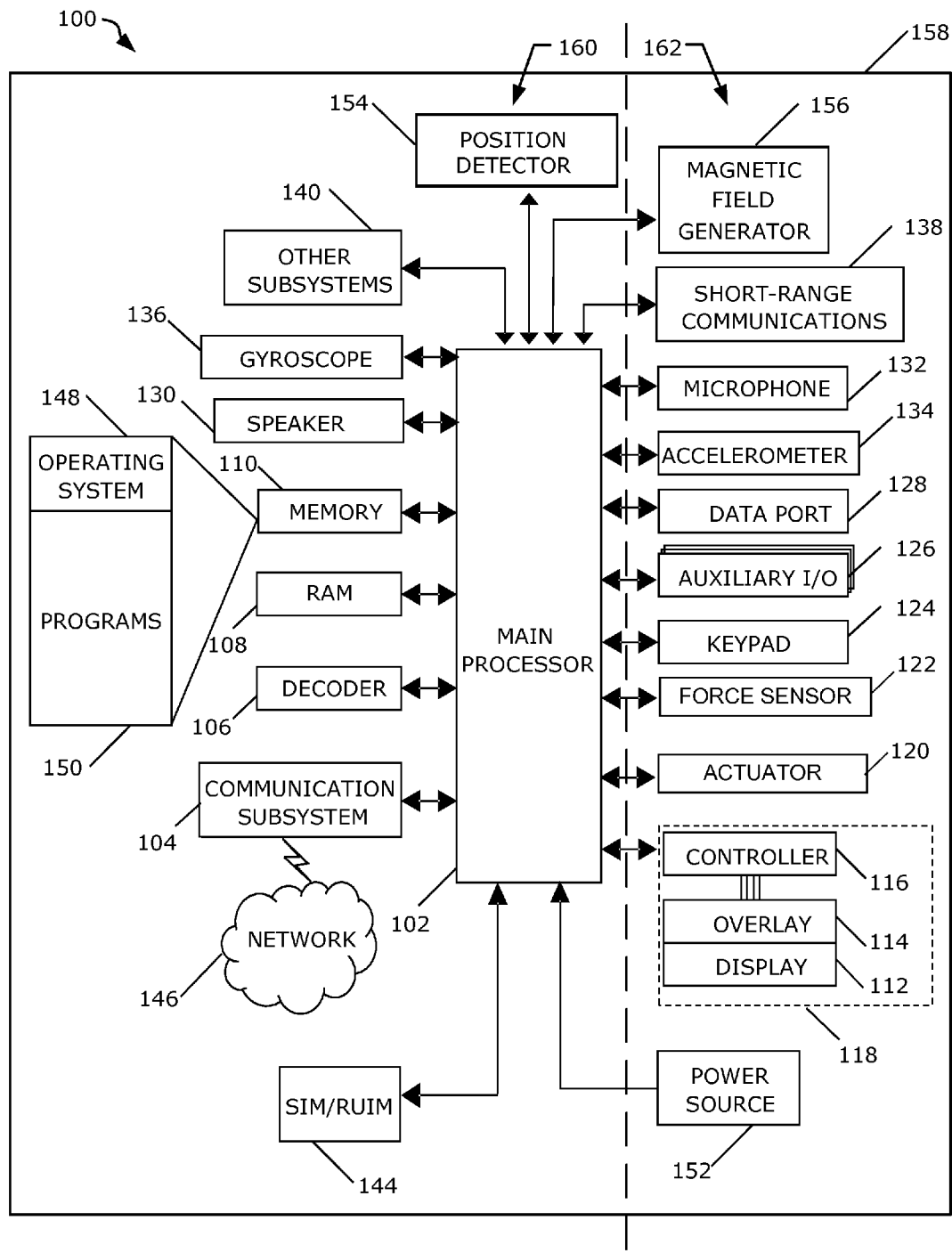
FIG. 1 is a block diagram of an example portable electronic device in accordance with the disclosure.

Methods and devices to determine a mobile device housing position are disclosed. An example device disclosed herein includes a housing having a first portion movably coupled to a second portion, the second portion to have a first position, a second position, and at least one intermediate position relative to the first portion, where the intermediate position is between the first and second positions; a position detector in the first portion, the position detector to measure a transitional magnetic field when the second portion is in the intermediate position and to measure a second magnetic field; and a processor to determine that the second portion is in the first position or the second position based on the transitional magnetic field and the second magnetic field.

In some implementations, the position detector is a three-axis magnetometer. In some such implementations, the position detector is to generate a signal representative of a multi-directional measurement of the transitional magnetic field or the second magnetic field. In some implementations of the device, the second portion includes a plurality of components that cause a change in a magnetic field strength measured by the position detector when the second portion is moved relative to the first portion, the processor to determine that the first portion is in the first position or the second position based on the measured magnetic field strength.

In some implementations of the device, the first and second portions of the housing are open in the first position and closed in the second position. In particular, in some examples the position detector is to measure the second magnetic field when the first and second portions of the housing are closed and to measure a third magnetic field when the first and second portions of the housing are open, wherein a measured strength of the third magnetic field determined by the position detector is greater than a measured strength of the second magnetic field. In some implementations of the device, wherein the first and second portions of the housing are configured in a slider arrangement, a swivel arrangement, or a flip arrangement. In some implementations, the position detector is to identify a net magnetic field to provide information for a compass application.

An example method disclosed herein includes measuring a first magnetic field using a position detector, identifying a first position of a first portion of a device housing relative to a second portion of the device housing based on the first magnetic field, measuring a transitional magnetic field different from the first magnetic field using the position detector, and identifying a second position of the first portion of the device housing relative to the second portion of the device housing based on the transitional magnetic field.

In some implementations, the method further includes measuring a third magnetic field after measuring the transitional magnetic field, wherein identifying the second position is based on a temporal sequence of the transitional magnetic field followed by the third magnetic field. In some implementations, the transitional magnetic field corresponds to an intermediate position between the first position and the second position.

In some implementations, at least one of measuring the first magnetic field or measuring the second magnetic field comprises measuring at least one directional magnetic field. In some examples, the device housing comprises at least one of a flip type, a slider type, or a swivel type.

In some implementations, the method further includes subtracting at least one of a first vector representative of a first stored magnetic field corresponding to the first position or a second vector representative of a second stored magnetic field corresponding to the second position from a measured magnetic field vector to generate a net magnetic field vector. In some such implementations, the method further includes displaying information representative of the measured magnetic field in an application of the device. In some implementations, the second position is an intermediate position. In some implementations, the method further includes providing the second position to an application of the device to control the application.

Another example method disclosed herein includes measuring a plurality of directional components of a first magnetic field using a position detector, and identifying a first position of a first portion of a device housing relative to a second portion of the device housing based on a comparison of the first magnetic field to a reference magnetic field.

In some implementations, the method further includes generating a first plurality of values representative of the plurality of directional components. In some such implementations, the comparison is based on comparing the first plurality of values to a second plurality of values representative of the reference magnetic field. In some implementations, the comparison includes determining whether a difference between the first plurality of values and the second plurality of values is less than a threshold. In some implementations, the first position is a transitional position when the difference between the first plurality of values and the second plurality of values is greater than the threshold.

Another example device disclosed herein includes a housing having a first portion movably coupled to a second portion, the second portion to have a first position, a second position, and at least one intermediate position relative to the first portion, wherein the intermediate position is between the first and second positions, a position detector in the first portion, the position detector to measure a transitional magnetic field when the second portion is in the intermediate position, and a processor to transform a value representative of the transitional magnetic field into an input value to an application A block diagram of an example portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 146. The wireless network 146 may be any type of wireless network, including, but not limited to, data wireless networks, voice wireless networks, and networks that support both voice and data communications. A power source 152, such as one or more rechargeable batteries or a port to an external power supply, powers the portable electronic device 100.

The processor 102 interacts with other components, such as Random Access Memory (RAM) 108, memory 110, a display 112 with a touch-sensitive overlay 114 operably connected to an electronic controller 116 that together comprise a touch-sensitive display 118, one or more actuator apparatus 120, one or more force sensors 122, a keypad 124, an auxiliary input/output (I/O) subsystem 126, a data port 128, a speaker 130, a microphone 132, an accelerometer 134, a gyroscope 136, short-range communications 138, and other device subsystems 140. User-interaction with a graphical user interface is performed through the touch-sensitive display 118. The processor 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the processor 102. In some examples, the display 112 may include a primary display and a secondary display. The display of information between the primary and the secondary displays are coordinated to provide information to a user when the electronic device is in an open position or a closed position.

To identify a subscriber for network access, the portable electronic device 100 uses a Subscriber Identity Module or a Removable User Identity Module (SIM/RUIM) card 144 for communication with a network, such as the wireless network 146. Alternatively, user identification information may be programmed into memory 110.

The portable electronic device 100 includes an operating system 148 and/or firmware and software programs or components 150 that are executed by the processor 102 to implement various applications and are typically stored in a persistent, updatable store such as the memory 110. Additional applications or programs may be loaded onto the portable electronic device 100 through the wireless network 146, the auxiliary I/O subsystem 126, the data port 128, the short-range communications subsystem 138, or any other suitable subsystem 140.

A received signal such as a text message, an e-mail message, or web page download is processed by the communication subsystem 104 and input to the processor 102. The processor 102 processes the received signal for output to the display 112 and/or to the auxiliary I/O subsystem 126. A subscriber may generate data items, for example e-mail messages, which may be transmitted over the wireless network 146 through the communication subsystem 104. For voice communications, the overall operation of the portable electronic device 100 is similar. The speaker 130 outputs audible information converted from electrical signals, and the microphone 132 converts audible information into electrical signals for processing.

The example portable electronic device 100 of FIG. 1 further includes a position detector 154 and a magnetic field generator 156. The position detector 154 of FIG. 1 detects magnetic field(s) present around the example portable electronic device 100 and generates voltage(s) representative of the detected magnetic field(s). The example magnetic field generator 156 of FIG. 1 is a permanent magnet that generates a substantially constant magnetic field, but may additionally or alternatively be implemented using an electromagnet or other magnetic field-generating device including any driving circuitry and/or logic. The example magnetic field(s) measurable by the position detector 154 include a magnetic field generated by the magnetic field generator 156 and the geomagnetic field of the earth. Additionally, the magnetic field generator 156 may be implemented using multiple permanent magnets, electromagnets, and/or some combination of magnetic element types.

In some examples, the position detector 154 is implemented using a three-axis magnetometer. Different types of magnetometers may be used, such as magneto-resistance sensors, magneto-impedance sensors, and/or any other past, present, or future type of magnetometer. For example, the magnetometer may be implemented using a multiple-axis magneto-impedance chip. In some examples, the position detector 154 is implemented using a magnetometer including solid-state Hall effect sensors. An example magnetometer is a monolithic component having directional solid-state Hall effect sensor(s). For example, at least one Hall effect sensor may be arranged to detect magnetic fields occurring in each of the three Cartesian coordinate axes (e.g., X, Y, and Z axes). The example position detector 154 generates the representative of a measured magnetic field, to the example processor 102. The example processor 102 transforms the signals into a vector and/or a plurality of scalars.

The portable electronic device 100 also includes a housing 158 having at least two portions 160 and 162. The two portions 160 and 162 of FIG. 1 are movably coupled to one another and may be changed from a first position, in which the first portion 160 is oriented in a first way relative to the second portion 162, to a second position, in which the first portion 160 is oriented in a second way relative to the second portion 162. Additionally, the first portion 160 and the second portion 162 of the housing 158 may be arranged in intermediate positions between and/or outside of the first or second positions. As used herein and unless stated otherwise, "changing the position of a housing" refers to changing a position and/or an orientation of at least one portion of the housing with respect to at least one other portion of the housing.

In the example of FIG. 1, the position detector 154 and the magnetic field generator 156 are in different ones of the portions 160, 162 of the housing 158. As a result, the movement of the first portion 160 relative to the second portion 162 changes the magnetic field generated by the magnetic field generator 156 as measured by the position detector 154. The processor 102 may then determine the position of the first portion 160 of the housing 158 relative to the second portion 162 by measuring the magnetic field via the position detector 154. Based on the determined position, the example processor 102 sets a state variable or other location in the memory 110 to represent the determined position for use by the operating system/firmware 148 and/or other applications or programs 150.

Other components of the example portable electronic device 100 may be distributed between the first portion 160 and the second portion 162 in any desired manner. An example distribution of the components within the housing 158 is illustrated in FIG. 1, but this distribution is not intended to be limiting. Additionally or alternatively, the housing 158 may include more portions that may also house one or more of the components of the portable electronic device 100.

In some examples, the positions of the magnetic field generator 156 and/or the position detector 154 are selected within the respective first portion 160 and/or the second portion 162 to cause a first magnetic field corresponding to the open position, a second magnetic field corresponding to the closed position, and/or transitional magnetic fields that are unlikely, rare, and/or nearly impossible to achieve via magnetic fields (e.g., fields other than those generated by the magnetic field generator 156). The example magnetic field generator 156 of FIG. 1 also is selected to distinguish the strength of the magnetic field generated by the magnetic field generator 156 from many, most, or all naturally-occurring or encountered magnetic fields. As used herein, the "strength" of a magnetic field refers to an amount of magnetic flux, either with respect to a particular direction or in total.

In some examples, the first portion 160 and the second portion 162 are arranged such that the first position, the second position, and a range of intermediate positions may be detected by the example position detector 154. The example position detector 154 provides a value representative of the intermediate position to the processor 102, which transforms the value to an input. The example processor 102 may then use the input as a control for an application that is executing on the example mobile electronic device 100. For example, the control may be input to a racing game application as an acceleration control, where a first intermediate position closer to the first position of the housing 158 causes an acceleration in the game to be higher than a second intermediate position closer to the second position of the housing 158.

Figure 2A:
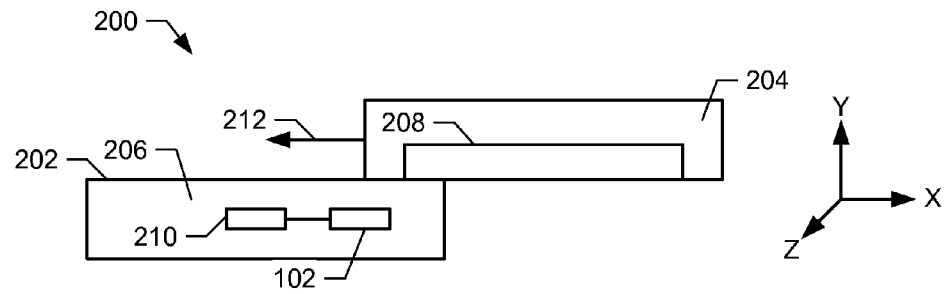
FIGS. 2A and 2B illustrate different positions of an example slider-type device.

FIG. 2A illustrates a first position of an example slider-type device 200. The example slider-type device 200 includes a housing 202 that has a first portion 204 and a second portion 206. The first portion 204 is in a first, open position relative to the second portion 206. A set of components 208 is housed within the first portion 204, and a magnetometer sensor 210 is housed within the second portion 206. The example components 208 may include any combination of the example components 102-152 of FIG. 1, and are attached to the housing 202 such that the components 208 have a constant orientation and/or position relative to the first portion 204. Similarly, the example magnetometer 210 is attached to the housing 202 such that the magnetometer 210 has a constant orientation and position relative to the second portion 206. Additionally, the example magnetometer 210 is coupled to the processor 102 in the second portion 206. From the illustrated open position of FIG. 2A, the example slider-type device 200 may be changed to a second position by sliding or translating the first portion 204 of the housing 202 in the illustrated direction 212.

Figure 2B:
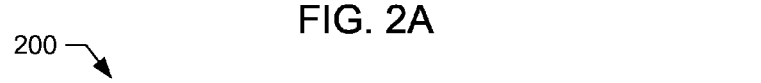

FIG. 2B illustrates a second position of the example slider-type device 200 of FIG. 2A. As shown in FIG. 2B, the first portion 204 of the housing 202 is in a second, closed position relative to the second portion 206. From the second position illustrated in FIG. 2B, the example slider-type device 200 may be changed to the first position of FIG. 2A by sliding or translating the first portion 204 of the housing 202 in the illustrated direction 214. While the example first portion 204 is flush with the second portion 206 in the second position of FIG. 2B, the second position may alternatively have the first portion 204 offset from the second portion 206 by a different amount and/or direction from the offset in the first position of FIG. 2A.

When the first portion 204 is in the open position as illustrated in FIG. 2A, the example magnetometer 210 detects a first magnetic field. The first magnetic field includes the geomagnetic field of the earth, the measurement of which is affected by the presence and the position of the components 208. When the first portion 204 is in the closed position illustrated in FIG. 2B, the example magnetometer 210 detects a second magnetic field, which includes the geomagnetic field of the earth. The components 208 affect the measurement of the second magnetic field in a different manner than the measurement of the first magnetic field due to the change in proximity between the magnetometer 210 and the components 208. Based on which of the first or second fields is detected, the example magnetometer 210 (and/or the processor 102 coupled to the magnetometer 210) determines the position of the example housing 202.

In some examples, the magnetometer sensor 210 identifies a transitional magnetic field by measuring the magnetic field while the first portion 204 of the housing 202 is being changed between the open position and the closed position. By detecting the transitional magnetic field, the magnetometer 210 determines that a change of position is occurring, and performs a second magnetic field measurement at a time after identifying the transitional field to determine the position of the housing 202.

Figure 3A:
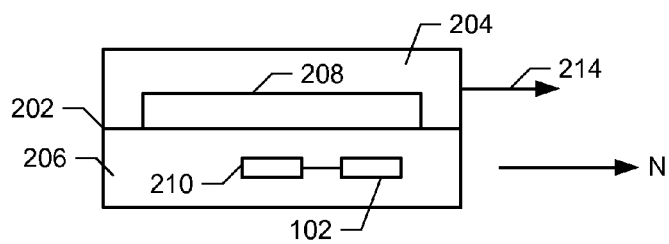
FIGS. 3A and 3B illustrate different positions of an example flip-type device.
Figure 3A:
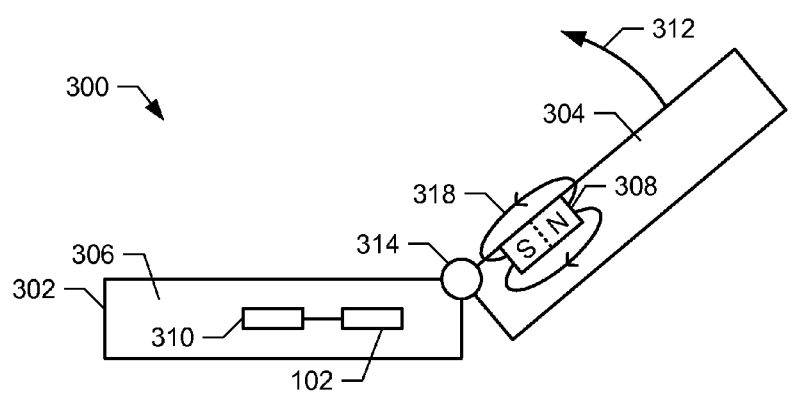

FIG. 3A illustrates a first position of an example flip-type device 300. The example flip-type device 300 includes a housing 302 that has a first portion 304 and a second portion 306. The first portion 304 is in a first, open position relative to the second portion 306. A magnetic element 308 is housed within the first portion 304, and a magnetometer 310 is housed within the second portion 306. The example magnetic element 308 is attached to the housing 302 such that the magnetic element 308 has a constant orientation and position relative to the first portion 304. Similarly, the example magnetometer 310 is attached to the housing 302 such that the magnetometer 310 has a constant orientation and position relative to the second portion 306. The example magnetometer 310 is coupled to the example processor 102 in the second portion 306. From the illustrated open position of FIG. 3A, the example flip-type device 300 may be changed to a second position by rotating the first portion 304 of the housing 302 in the illustrated direction 312 about an axis 314 (e.g., a pin rotatably coupling the first portion 304 to the second portion 306).

Figure 3B:
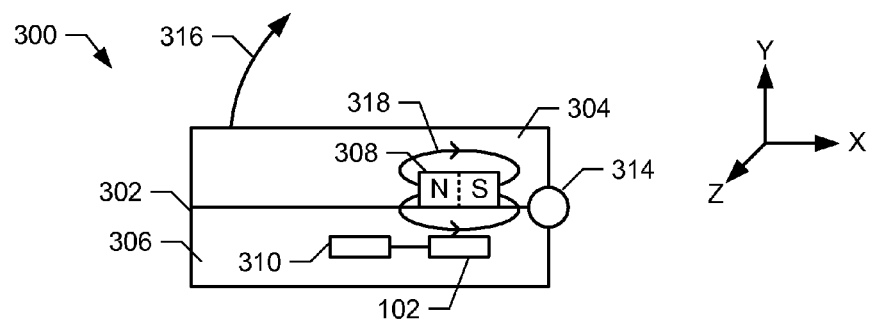

FIG. 3B illustrates a second position of the example flip-type device 300 of FIG. 3A. As shown in FIG. 3B, the first portion 304 of the housing 302 is in a second, closed position relative to the second portion 306. From the second position illustrated in FIG. 3B, the example flip-type device 300 may be changed to the first position by flipping or rotating the first portion 304 of the housing 302 in the illustrated direction 316. While the example first portion 304 is flush with the second portion 306 in the second position of FIG. 3B, the second position may alternatively have the first portion 304 opened, offset, rotated, and/or otherwise differently positioned from the second portion 306 by a different amount and/or direction from the first position of FIG. 3A.

When the first portion 304 is in the open position as illustrated in FIG. 3A, the example magnetometer 310 detects a first magnetic field. The first magnetic field includes at least a magnetic field 318 generated by the magnetic element 308, and may be a combination of the magnetic field 318 and the geomagnetic field of the earth. However, in the example of FIGS. 3A and 3B, the magnetic field 318 is the most significant component of the magnetic field measured by the magnetometer 310. When the first portion 304 is in the closed position illustrated in FIG. 3B, the example magnetometer 310 detects a second magnetic field. Based on which of the first or second fields is detected, the example magnetometer 310 (or a processor coupled to the magnetometer 310 such as the processor 102 of FIG. 1) determines the position of the example housing 302.

Figure 4A:
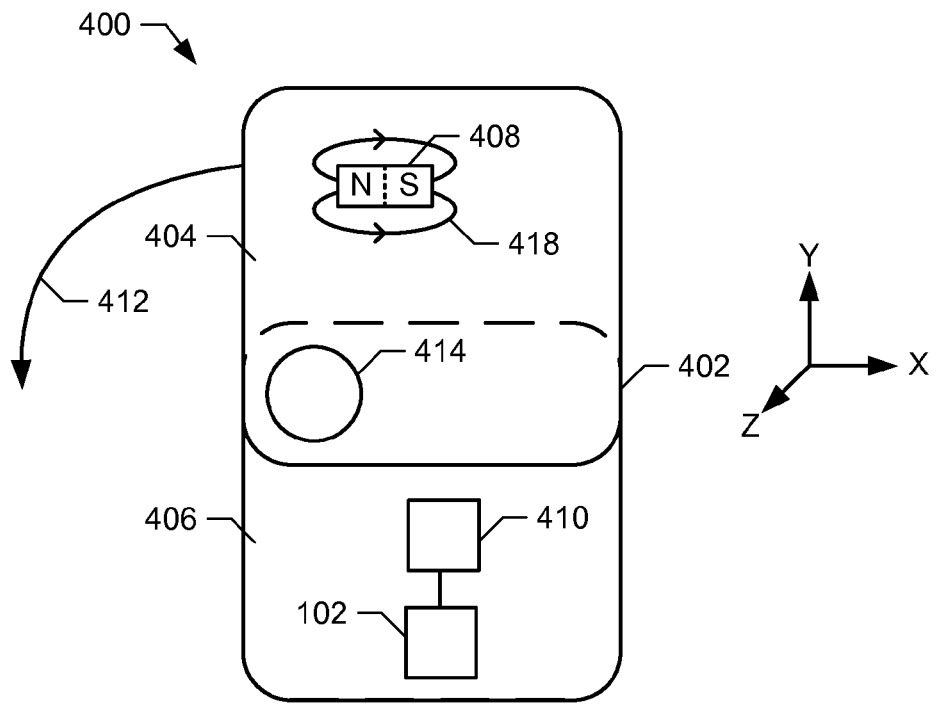
FIGS. 4A and 4B illustrate different positions of an example swivel-type device.

FIG. 4A illustrates a first position of an example swivel-type device 400. The example swivel-type device 400 includes a housing 402 that has a first portion 404 and a second portion 406. The first portion 404 is in a first, open position relative to the second portion 406. A magnetic element 408 is housed within the first portion 404, and a magnetometer 410 is housed within the second portion 406. The example magnetic element 408 is attached to the housing 402 such that the magnetic element 408 has a constant orientation and position relative to the first portion 404. Similarly, the example magnetometer 410 is attached to the housing 402 such that the magnetometer 410 has a constant orientation and position relative to the second portion 406. The example magnetometer 410 is also coupled to the example processor 102. From the illustrated open position of FIG. 4A, the example swivel-type device 400 may be changed to a second position by rotating the first portion 404 of the housing 402 in the illustrated direction 412 around a bearing 414 (e.g., a roller bearing rotatably coupling the first portion 404 to the second portion 406).

Figure 4B:
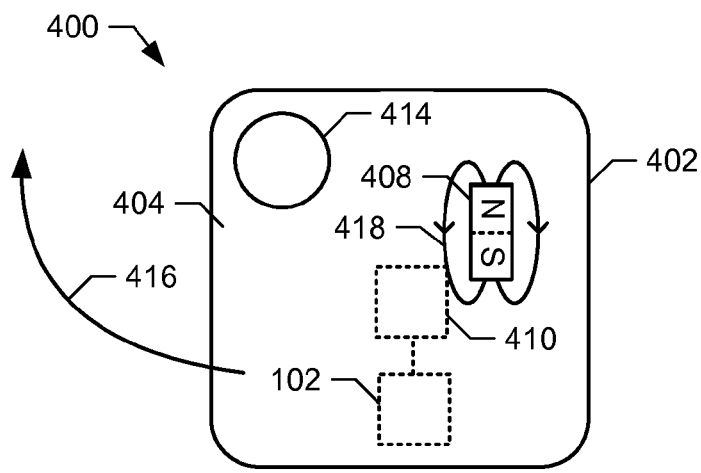

FIG. 4B illustrates a second position of the example swivel-type device 400 of FIG. 4A. As shown in FIG. 4B, the first portion 404 of the housing 402 is in a second, closed position relative to the second portion 406. In the view of FIG. 4B, the first portion 404 of the housing 402 obscures the second portion 406. From the second position illustrated in FIG. 4B, the example swivel-type device 400 may be changed to the first position by flipping or rotating the first portion 404 of the housing 402 in the illustrated direction 416. While the example first portion 404 is flush with the second portion 306 in the second position of FIG. 4B, the second position may alternatively have the first portion 404 offset from the second portion 406 by a different amount and/or direction from the offset in the first position of FIG. 4A.

When the first portion 404 is in the open position as illustrated in FIG. 4A, the example magnetometer 410 detects a first magnetic field. The first magnetic field includes at least a magnetic field 418 generated by the magnetic element 408, and may be a combination of the magnetic field 418 and the geomagnetic field of the earth. However, in the example of FIGS. 4A and 4B, the magnetic field 418 is the most significant component of the magnetic field measured by the magnetometer 410. When the first portion 404 is in the closed position illustrated in FIG. 4B, the example magnetometer 410 detects a second magnetic field. Based on which of the first or second fields is detected, the example magnetometer 410 (or a processor coupled to the magnetometer 410 such as the processor 102 of FIG. 1) determines the position of the example housing 402.

While FIGS. 3A, 3B, 4A, and 4B are illustrated as using the example magnetic elements 308, 408, the example devices 300, 400 may alternatively be implemented using components in a manner similar to the example components 208 of FIGS. 2A and 2B. That is, the example magnetic elements 308, 408 may be removed from the example devices 300, 400, and the example magnetometers 310, 410 may determine a magnetic signature based on the effects caused by the positions of the components. Similarly, the example device 200 of FIGS. 2A and 2B may be implemented using a magnetic element and/or a magnetometer. These examples are for illustration purposes, and other combinations may be used to implement any of the example devices 200, 300, 400.

Figure 5:
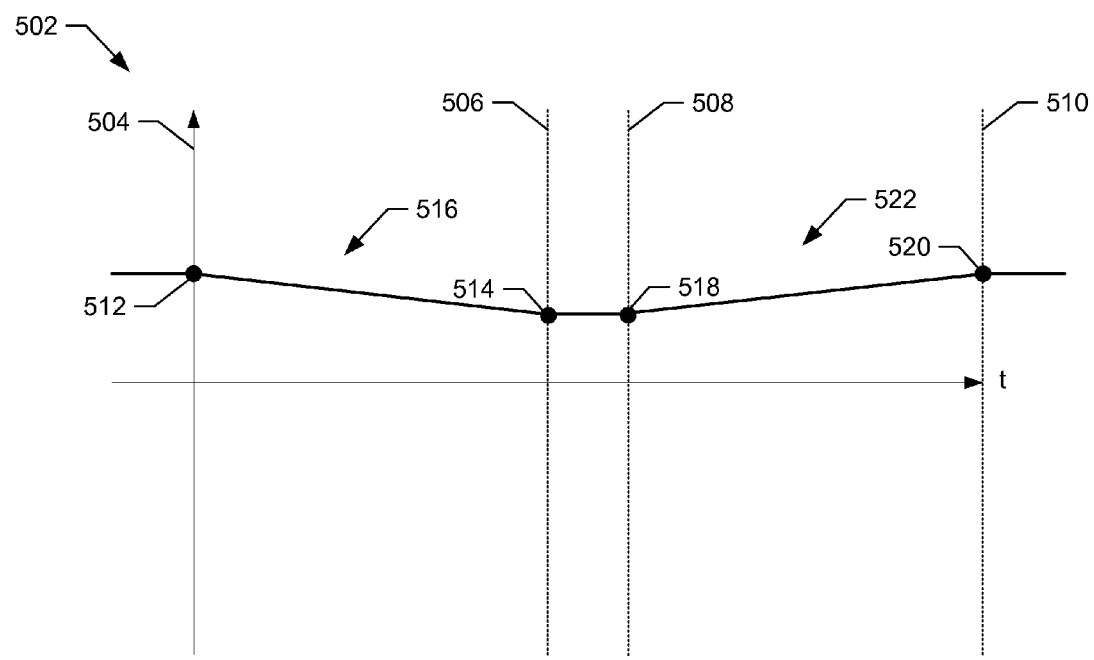
FIG. 5 shows a graph of an example magnetic field signal detected by an example magnetometer during a change from the first position of FIG. 2A of the slider-type device to the second position of the slider-type device of FIG. 2B.

FIG. 5 shows a graph of an example magnetic field signal 502 detected by the example magnetometer 210 of FIGS. 2A and 2B during a change from the first position of the slider-type device 200 of FIG. 2A to the second position of the slider-type device 200 of FIG. 2B. The example signal 502 is representative of a net magnetic field (e.g., the total flux in the X, Y, Z axes measured by the magnetometer 210), illustrated with respect to time. As in some example magnetometers, the signal (e.g., voltage) output from the magnetometer 210 increases as the field strength increases (e.g., with additional magnetic flux) and decreases as the field strength decreases (e.g., with less magnetic flux).

A user of the example slider-type device 200 begins changing the position of the device 200 from the open position to the closed position at an illustrated time 504 and concludes the change of position at a time 506. At a time 508, the user of the device 200 begins changing the position of the device 200 from the closed position to the open position, and concludes the change of position at a time 510. Before the time 504, the device 200 is in the open position and the magnetic field is represented by a first field signal 512. At the time 506, the device 200 is in the closed position and the magnetic field is represented by a second field signal 514.

Between the first time 504 and the second time 506, the example magnetometer 210 of FIGS. 2A and 2B may make additional measurement(s) that result in a transitional magnetic field signal 516. In some examples, the processor 102 uses the transitional magnetic field signal 516 as an input or control to an application operating on the processor 102. In this manner, the first portion 204 and the second portion 206 of the example slider-type device 200 may be used as a type of analog-style control. As illustrated in FIG. 5, the example transitional magnetic field signal 516 decreases from the field signal 512 (e.g., as the components 208 get closer to the magnetometer 210, the magnetic flux decreases) to the field signal 514. As illustrated in FIG. 5, the example components 208 of FIGS. 2A and 2B are arranged to provide a substantially linear relationship between the position of the housing 202 and the magnetic field signal 502. Thus, the example processor 102 may determine or approximate the position of the first portion 204 relative to the second portion 206 based on the measured magnetic field signal 502.

Between the times 506 and 508, the signal 502 remains the same. In some examples, the device 200 may change orientation with respect to the geomagnetic field (e.g., by turning the housing 202 in any direction(s)), but the signal 502 remains the same due to the aggregation of the magnetic field strengths to generate the signal 502. When the user begins changing the position of the housing 202 from the closed position to the open position at the time 508, the magnetic field measured by the magnetometer 210 is represented by a magnetic field signal 518. When the example housing 202 reaches the open position, the magnetic field measured by the magnetometer 210 is represented by a magnetic field signal 520.

The example magnetometer 210 makes additional measurement(s) that result in a second transitional magnetic field signal 522. In the example of FIG. 5, the second transitional magnetic field signal 522 is substantially the temporal opposite of the transitional magnetic field signal 516. In particular, the example second transitional magnetic field signal 522 increases from the time 508 to the time 510 as the components 208 are moved farther from the magnetometer 210.

The example transitional magnetic field signals 516, 522 of FIG. 5 may be identified by the magnetometer 210 and/or the processor 102 of FIGS. 1, 2A, and 2B to identify a change in position of the example housing 202. The signal strengths, the shapes of the transitional fields, and/or the starting signals and/or the ending signals may be different from those shown in FIG. 5 based on the configuration of the components 208 and the magnetometer 210. In some examples, the magnetometer 210 is calibrated to determine the characteristic magnetic fields of the slider-type device 200 and/or determine a relationship between the magnetic field signal 502 and the position of the housing 202 to use the example housing 202 as an input to an application.

FIG. 6 shows graphs of example directional magnetic field signals 602, 604, 606 detected by the example magnetometer 310 of FIGS. 3A and 3B during a change from the first position of the flip-type device 300 of FIG. 3A to the second position of the flip-type device 300 of FIG. 3B. The example signals 602, 604, 606 are representative of the respective directional magnetic fields for the X, Y, Z axes measured by the magnetometer 310 using the coordinate arrangement shown in FIGS. 3A and 3B, illustrated with respect to time. As in some example magnetometers, the signal (e.g., voltage) output from the magnetometer 310 increases as the field strength increases (e.g., with additional magnetic flux) and decreases as the field strength decreases (e.g., with less magnetic flux).

A user of the example flip-type device 300 begins changing the position of the device 300 from the open position to the closed position at the illustrated time 608 and concludes the change of position at the time 610. Before the time 608, the device 300 is in the open position and the magnetic field is represented by a first X field signal 612, a first Y field signal 614, and a first Z field signal 616. After the time 610, the device 300 is in the closed position and the magnetic field is represented by a second X field signal 618, a second Y field signal 620, and a second Z field signal 622.

Between the first time 608 and the second time 610, the example magnetometer 310 of FIGS. 3A and 3B may make additional measurement(s) that result in measuring a transitional magnetic field. As illustrated in FIG. 6, the example magnetic field signal 602 in the X direction increases from the field signal 612 (e.g., as the magnetic element 308 gets closer to the magnetometer 310, the magnetic flux in the X direction increases) slowly and then more rapidly. The magnetic field signal 604 in the Y direction begins with a field signal 614, which is negative due to the direction of the magnetic flux in the Y direction at the first time. As the user closes the flip-type device 300, the magnetic field signal 604 increases in the negative Y direction to the second magnetic field 620 as the magnetic element 308 gets closer to the magnetometer 310 and the orientation of the magnetic field in the Y direction remains the same. The example magnetic field signal 606 of FIG. 6 in the Z direction does not change because, in the illustrated example, the magnetic element 308 and the north-south poles of the magnetic element 308 is in the same position with respect to the Z direction as the magnetometer 310.

Figure 7:
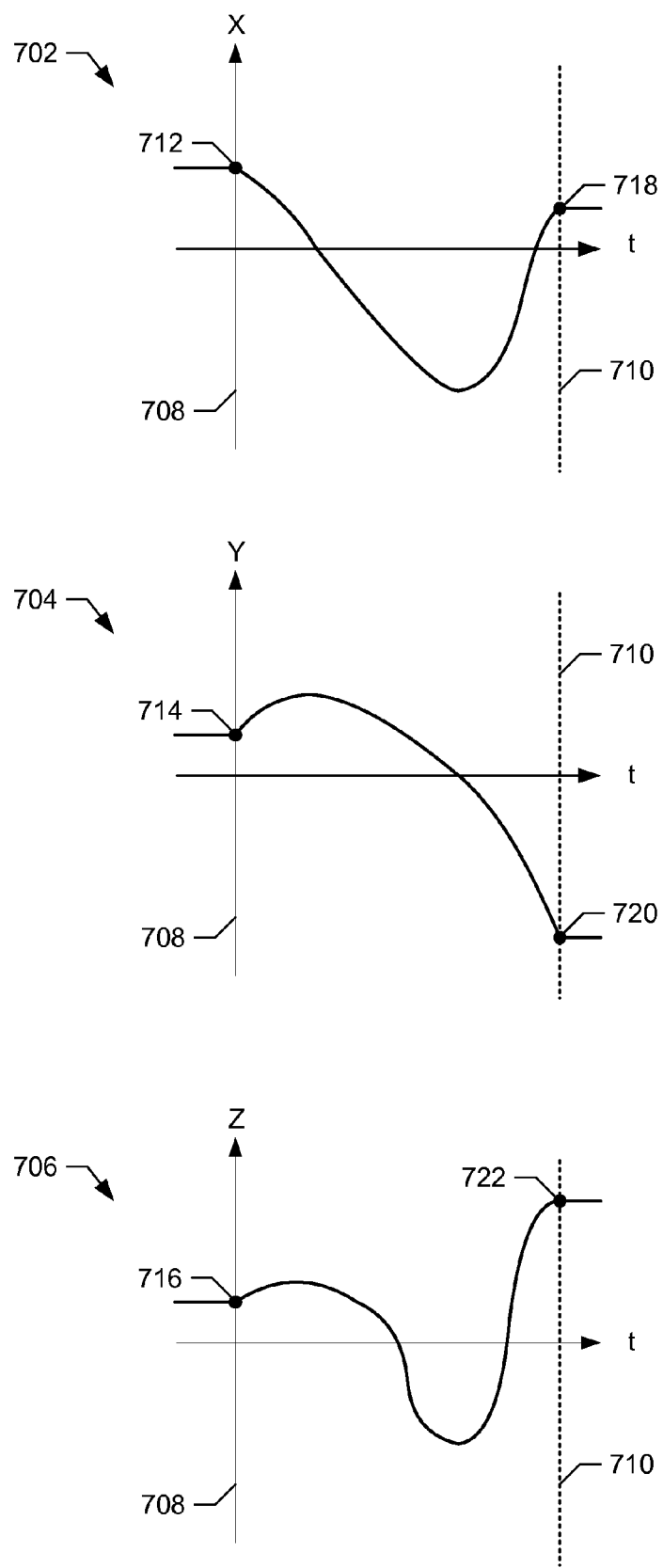
FIG. 7 shows graphs of example directional magnetic field signals detected by an example magnetometer during a change from the first position of the swivel-type device of FIG. 4A to the second position of the swivel-type device of FIG. 4B.

FIG. 7 shows graphs of example directional magnetic field signals 702, 704, 706 detected by the example magnetometer 410 of FIGS. 4A and 4B during a change from the first position of the swivel-type device 400 of FIG. 4A to the second position of the swivel-type device 400 of FIG. 4B. The example signals 702, 704, 706 are representative of the respective directional magnetic fields for the X, Y, Z axes measured by the magnetometer 410 using the coordinate arrangement shown in FIGS. 4A and 4B, illustrated with respect to time. As in some example magnetometers, the signal (e.g., voltage) output from the magnetometer 410 increases as the field strength increases (e.g., with additional magnetic flux) and decreases as the field strength decreases (e.g., with less magnetic flux).

A user of the example swivel-type device 400 begins changing the position of the device 400 from the open position to the closed position at the illustrated time 708 and concludes the change of position at the time 710. Before the time 708, the device 400 is in the open position and the magnetic field is represented by a first X field signal 712, a first Y field signal 714, and a first Z field signal 716. After the time 710, the device 400 is in the closed position and the magnetic field is represented by a second X field signal 718, a second Y field signal 720, and a second Z field signal 722.

Between the first time 708 and the second time 710, the example magnetometer 410 of FIGS. 4A and 4B may make additional measurement(s) that result in measuring a transitional magnetic field. As illustrated in FIG. 7, the example magnetic field signal 702 in the X direction decreases from the first X field signal 712 to a magnetic field signal having an opposite direction to the first X field signal 712 (e.g., as the magnetic element 408 gets slightly farther from the magnetometer 710 and changes the magnetic field orientation relative to the magnetometer) and then increases to the second X field signal 718 (e.g., as the magnetic element 408 gets closer to the magnetometer 410 and the magnetic element 408 again changes the orientation of the magnetic field relative to the magnetometer 410). The magnetic field signal 704 in the Y direction increases from the first Y field signal 714 as the magnetic element 408 gets closer to the magnetometer 410. The magnetic field signal 704 in the Y direction then decreases to the second Y field signal 720, which has a polarity opposite that of the first Y field signal 714 (e.g., as the magnetic element 408 changes the polarity of the magnetic field relative to the magnetometer 410 and then gets closer to the magnetometer 410). The example magnetic field signal 706 in the Z direction begins at the first Z field signal 716 and slightly increases. The example magnetic field signal 706 then decreases and changes polarity (e.g., as the magnetic element 408 changes the polarity of the magnetic field relative to the magnetometer 410). The example magnetic field signal 706 then changes orientation and increases to the second Z field signal 722 (e.g., as the example magnetic element 408 again changes the orientation of the magnetic field relative to the magnetometer 410 and gets closer to the magnetometer 410).

While example magnetic field signals have been illustrated in FIGS. 5-7 for each of the example devices 200, 300, 400 and housing types of FIGS. 2A-4B, the example magnetic field signals are dependent on the arrangement, movement, and/or orientation of the magnetic elements and magnetometers relative to each other. In other words, if any of the specific arrangement, movement, and/or orientation of the magnetic element changes with respect to the magnetometer from the respective example arrangements, movements, and/or orientations of FIGS. 2A-4B, the first, second, and/or transitional magnetic fields and, thus, the signals representative of those magnetic fields will also change. Additionally, the example magnetic field signals 502-506, 602-606, and 702-706 of FIGS. 5-7 have been approximated assuming negligible external interference from magnetic or ferrous elements. The inclusion, arrangement, and/or omission of magnetic or ferrous elements within and/or near the devices 200, 300, and/or 400 may also affect the magnetic field signals.

While an example manner of implementing the mobile electronic device 100 of FIG. 1 has been illustrated in FIGS. 2A, 2B, 3A, 3B, 4A and 4B, one or more of the elements, processes and/or devices illustrated in FIGS. 1-4B may be combined, divided, re-arranged, omitted, eliminated and/or implemented in any other way. Further, the example processor 102, the example position detector 154, the example magnetic field generator 156 and/or, more generally, the example mobile electronic device 100 of FIG. 1 may be implemented by hardware, software, firmware and/or any combination of hardware, software and/or firmware. Thus, for example, any of the example processor 102, the example position detector 154, the example magnetic field generator 156 and/or, more generally, the example mobile electronic device 100 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus claims are read to cover a purely software and/or firmware implementation, at least one of the example processor 102, the example position detector 154, and/or the example magnetic field generator 156 are hereby expressly defined to include a computer readable medium such as a memory, DVD, CD, etc. storing the software and/or firmware. Further still, the example mobile electronic device 100 of FIG. 1 may include one or more elements, processes and/or devices in addition to, or instead of, those illustrated in FIG. 1, and/or may include more than one of any or all of the illustrated elements, processes and devices.

Figure 8:
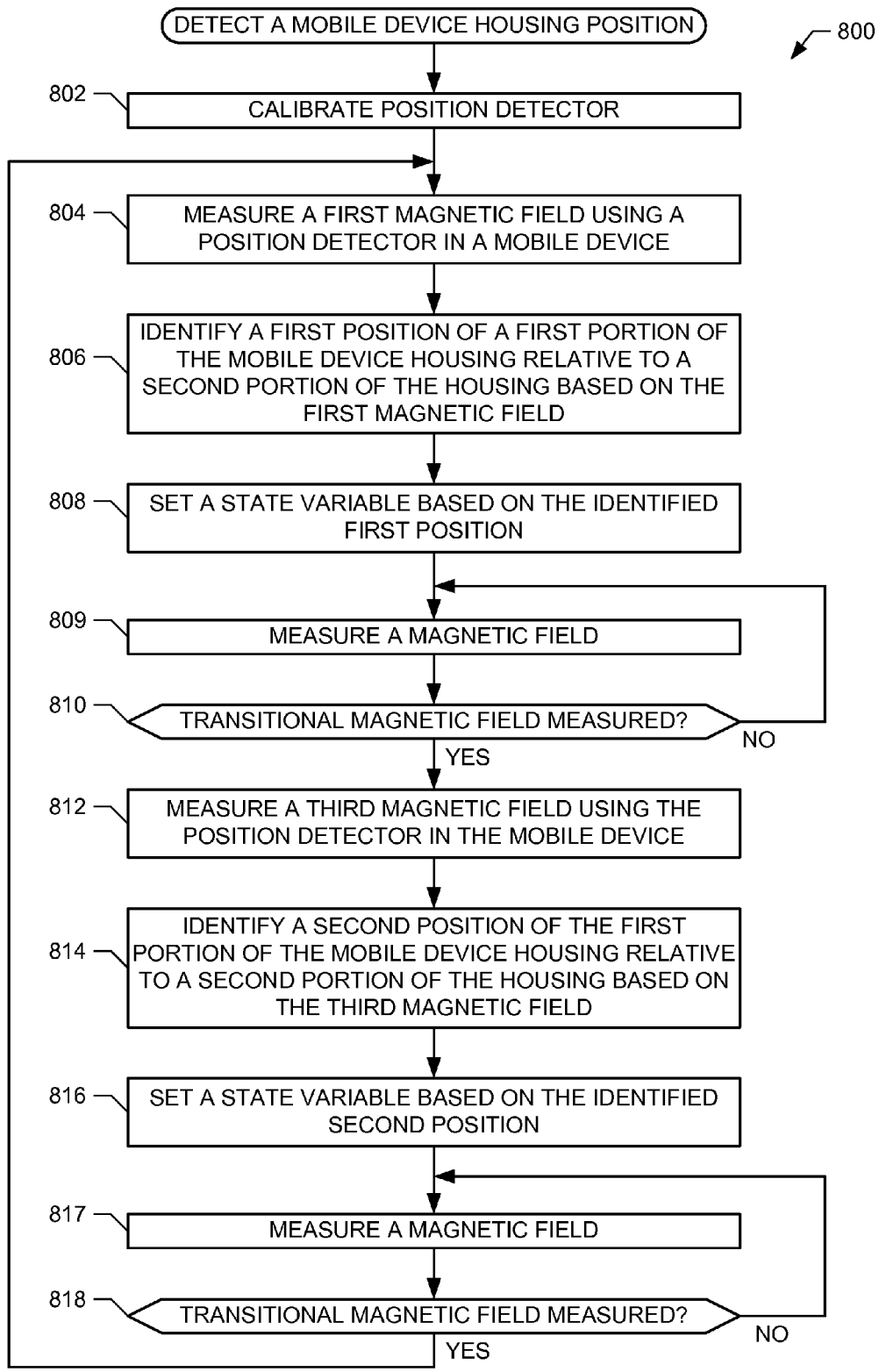
FIG. 8 is a flowchart representative of an example method to detect a mobile device housing position.
Figure 9:
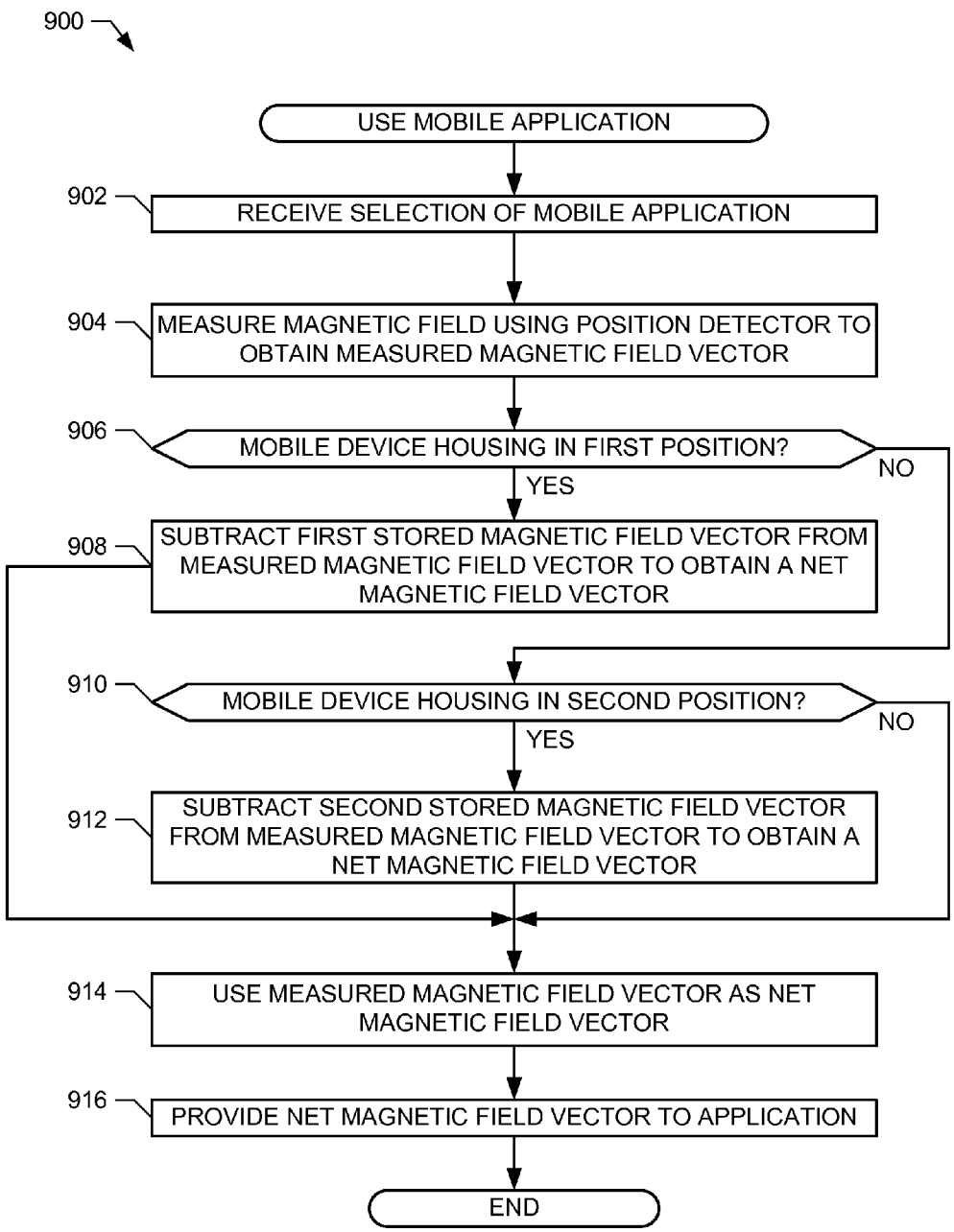
FIG. 9 is a flowchart representative of an example method to use an application in a mobile electronic device.
Figure 10:
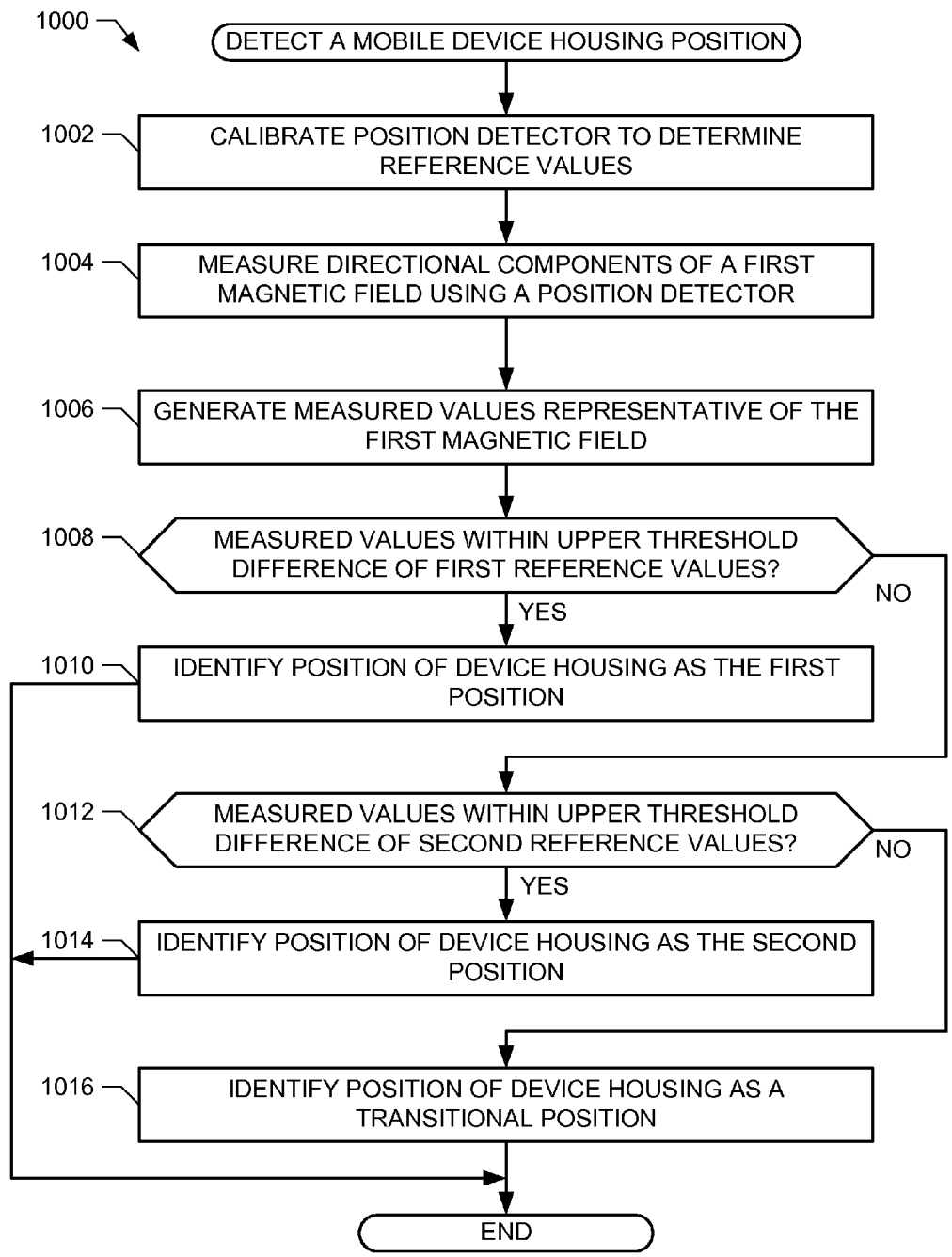
FIG. 10 is a flowchart representative of another example method to detect a mobile device housing position.

Flowcharts representative of example machine readable instructions for implementing the apparatus mobile electronic device 100 of FIG. 1 is shown in FIGS. 8, 9, and 10. In this example, the machine readable instructions comprise program(s) for execution by a processor such as the processor 102 shown in the example mobile electronic device 100 discussed above in connection with FIG. 1. The program(s) may be embodied in software stored on a computer readable medium such as an electrically erasable programmable read-only memory (EEPROM), a Secure Digital (SD) card or the like, Flash-based internal storage drive, and/or a memory associated with the processor 102, but the entire program(s) and/or parts thereof could alternatively be executed by a device other than the processor 102 and/or embodied in firmware or dedicated hardware. Further, although the example methods are described with reference to the flowchart illustrated in FIGS. 8, 9, and 10, many other methods of implementing the example mobile electronic device 100 may alternatively be used. For example, the order of execution of the blocks may be changed, and/or some of the blocks described may be changed, eliminated, or combined.

As mentioned above, the example methods of FIGS. 8, 9, and 10 may be implemented using coded instructions (e.g., computer readable instructions) stored on a tangible computer readable medium such as an EEPROM, an SD card or the like, Flash-based internal storage drive, a memory associated with the processor 102 and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 8, 9, and 10 may be implemented using coded instructions (e.g., computer readable instructions) stored on a non-transitory computer readable medium such as an EEPROM, an SD card or the like, Flash-based internal storage drive, a memory associated with the processor 102 and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

FIG. 8 is a flowchart representative of an example method 800 to detect a mobile device housing position. The example method 800 may be used, for example, by the example mobile communication device of FIG. 1 to detect a position of the first portion 160 of the housing 158 with respect to the second portion 162. The example method 800 begins by calibrating a position detector (e.g., the position detector 154 of FIG. 1, the magnetometer 210 of FIG. 2, the magnetometer 310, 410 of FIGS. 3 and 4) (block 802). The calibration is performed to identify the magnetic fields that are characteristic of a first and second position of a mobile communication device housing (e.g., the housings 202, 302, 402 of FIGS. 2A-4B). Calibrating the position detector may be performed using any of a number of methods such as, for example, spinning the mobile communication device containing the magnetometer in a circle while the magnetometer measures the magnetic field. The spinning may be performed in each of the positions of the housing of the position detector. The position detector then determines the difference in the reading between the upper and lower limits of the magnetic field (e.g., the north and south poles) for each position. From these limits, the magnetic field 216, 318, 418 generated by the magnetic element 208, 308, 408 may be determined In some examples, vectors or other values representative of the magnetic fields 216, 318, 418 are stored in association with the respective position in a memory.

After calibration, the example mobile communication device measures a first magnetic field using a position detector (e.g., the position detector 154 of FIG. 1, the magnetometer 210 of FIG. 2, the magnetometer 310, 410 of FIGS. 3 and 4) (block 804). For example, the magnetometer 210 measures the magnetic field(s) present around the mobile communication device 200. The measurement is converted to signal(s), value(s), vectors(s), or other representation(s) (e.g., a higher voltage corresponding to a stronger measured magnetic field) of the magnetic field. The example mobile communication device (e.g., via the processor 102 of FIG. 1) identifies a first position of the first portion 160 of the housing 158 of the mobile electronic device 100 relative to the second portion 162 of the device 100 based on the first magnetic field (block 806). For example, if the example mobile electronic device 100 is a slider-type device such as the device 200 of FIG. 2, the processor 102 may determine that the housing 158 is in an open position based on the magnetometer 210 measuring a magnetic field similar or identical to the field described by the first magnetic field signals 512, 514, 516 of FIG. 5. The example processor 102 sets a state variable in the mobile device 200 based on the first position (block 808). For example, the processor 102 may set the state variable to identify the first position to firmware and/or a software application being executed by the mobile device 200. Such a software application or firmware may use the position to adjust readings for housing position-based and/or position detector-based features.

The example magnetometer 210 measures another magnetic field (block 809). The example processor 102 then determines whether a transitional magnetic field has been measured (block 810). For example, the processor 102 may determine whether the magnetometer 210 has generated measurement(s) of the magnetic fields that are substantially different than the first magnetic field measured in block 804. In some examples, a substantially different magnetic field is an absolute difference in the magnetic field (e.g., a total magnetic flux and/or considering each of the X, Y, and Z directional fields) that is greater than the change in the magnetic field resulting from a geomagnetic measurement. In some other examples, the transitional magnetic field is a predetermined change or pattern in the magnetic field indicative of the user moving the mobile device housing 202 from the first position to a second position. If the processor 102 does not identify a transitional magnetic field (block 810), control returns to block 809 to measure another magnetic field.

On the other hand, if the processor 102 does identify a transitional magnetic field (block 810), the processor 102 measures a third magnetic field using the position detector 154 (e.g., the magnetometer 210, the magnetometer 310, 410) (block 812). The example mobile communication device (e.g., via the processor 102 of FIG. 1) identifies a second position of the first portion 160 of the housing 158 of the mobile electronic device 100 with respect to the second portion 162 of the device 100 based on the third magnetic field (block 814). For example, the processor 102 may determine that the example slider-type device 200 of FIG. 2 is in a closed position based on the magnetometer 210 measuring a magnetic field similar or identical to the field described by the magnetic field signals 514, 518 of FIG. 5. The example processor 102 sets a state variable in the mobile device 200 based on the second position (block 816). For example, the processor 102 may set the state variable to identify the second position to firmware and/or a software application being executed by the mobile device 200.

The example magnetometer 210 measures another magnetic field (block 817). The example processor 102 then determines whether a transitional magnetic field has been identified (block 818). In some examples, block 818 is performed in a similar or identical manner to block 810. If the processor 102 does not identify a transitional magnetic field (block 818), control returns to block 817 to measure another magnetic field. On the other hand, if the processor 102 does identify a transitional magnetic field (block 818), control returns to block 804 to identify another magnetic field. In some other examples, however, the processor 102 identifies a fourth magnetic field and/or identifies a third position of the mobile device.

FIG. 9 is a flowchart representative of an example method 900 to use an application in a mobile electronic device. The example method 900 may be used for firmware or software applications such as a compass application running on a mobile device such as the mobile electronic device 100 of FIG. 1, where the application displays a heading to the user based on the orientation of the device with respect to the geomagnetic field of the earth. The example method 900 may be used and/or modified for other position detector-based applications as well.

The example method 900 begins by receiving (e.g., at the processor 102 of FIG. 1) a selection of an application (e.g., a compass application) (block 902). The example mobile electronic device 100 measures a magnetic field using a position detector (e.g., the position detector 154 of FIG. 1, the magnetometer 210 of FIGS. 2A, 2B, the magnetometer 310, 410 of FIGS. 3A-4B) to obtain a measured magnetic field vector (block 904). The vector is representative of the measured magnetic field, and in some examples is a set of numbers representative of the X, Y, and Z components of the magnetic field.

The example processor 102 then determines whether the mobile device housing (e.g., the housing 158 of FIG. 1) is in the first position (block 906). For example, the processor 102 may compare the measured magnetic field vector to a first stored magnetic field vector and/or a second stored magnetic field vector to determine whether the measured magnetic field vector is close to the first stored magnetic field vector and/or closer to the first stored magnetic field vector than to the second stored magnetic field vector. The example processor 102 may additionally or alternatively retrieve a state variable representative of the position of the housing 158. If the housing 158 is in the first position (block 906), the example processor 102 subtracts the first stored magnetic field vector from the measured magnetic field vector to obtain a net magnetic field vector (block 908).

On the other hand, if the housing 158 is not in the first position (block 906), the example processor 102 determines whether the housing 158 is in a second position (block 910). For example, the processor 102 may compare the measured magnetic field vector to the first stored magnetic field vector and/or the second stored magnetic field vector to determine whether the measured magnetic field vector is close to the second stored magnetic field vector and/or closer to the second stored magnetic field vector than to the first stored magnetic field vector. The example processor 102 may additionally or alternatively retrieve a state variable representative of the position of the housing 158. If the housing is in the second position (block 910), the example processor 102 subtracts the second stored magnetic field vector from the measured magnetic field vector to obtain the net magnetic field vector (block 912). If the housing 158 is in neither the first position (block 906) nor the second position (block 910), the example processor 102 uses the measured magnetic field vector as the net magnetic field vector (block 914). For example, the measured magnetic field vector may correspond to an intermediate position that may be used to control the mobile application similar to an analog input.

After obtaining the net magnetic field vector (e.g., by subtracting the first stored magnetic field vector from the measured magnetic field vector in block 908, subtracting the second stored magnetic field vector from the measured magnetic field vector in block 912, or using the measured magnetic field vector in block 914), the example processor provides the net magnetic field vector to the application (block 916). The example method 900 may then end and/or iterate to continue using the application.

FIG. 10 is a flowchart representative of another example method 1000 to detect a mobile device housing position. The example method 1000 may be used to implement the example mobile electronics device 100 of FIG. 1 and/or any of the example devices 200, 300, 400 of FIGS. 2A-4B. For example, the processor 102 may invoke the example method 1000 of FIG. 10 to determine a position of the device housing 158 to supply the position to a requesting application, and/or may invoke the method 1000 periodically or aperiodically to control a user interface of the mobile electronics device 100.

The example method 1000 begins by calibrating a position detector (e.g., the position detector 154 of FIG. 1, the magnetometer 210 of FIG. 2, or the example magnetometers 310, 410 of FIGS. 3A-4B) (block 1002). The calibration may be performed in a manner similar to the calibration of block 802 discussed above. In some examples, the calibration results in at least first reference values (e.g., representative of a first magnetic field and/or characteristic corresponding to a first housing position) and second reference values (e.g., representative of a second magnetic field and/or characteristic corresponding to a second housing position). The example position detector 154 then measures the directional components of a first magnetic field (block 1004). The position detector 154 generates measured values that are representative of the first magnetic field (block 1006). For example, the position detector 154 may provide signal(s), value(s), vectors(s), or other representation(s) (e.g., a higher voltage corresponding to a stronger measured magnetic field) of the first magnetic field to the processor 102.

The example processor 102 compares the measured values to the first reference value(s) (e.g., obtained from the calibration in block 1002) (block 1008). In some examples, the comparison determines whether a difference between the measured values and the first reference value(s) are less than an upper threshold. If the measured values are within an upper threshold difference from the first reference values (block 1008), the example processor 102 identifies the position of the device housing 158 as the first position (e.g., the first portion 160 has a first position relative to the second portion 162) (block 1010).

On the other hand, if the measured values are not within the upper threshold difference from the first reference value(s) (block 1008), the processor 102 determines whether the measured values are within the upper threshold difference from the second reference value(s) (block 1012). If the processor 102 determines that the measured values are within the upper threshold difference from the second reference value(s) (block 1012), the processor 102 identifies the position of the device housing 158 as the second position (e.g., the first portion 160 has a second position relative to the second portion 162) (block 1014).

If the processor 102 determines that the measured values are not within the upper threshold difference from the second reference value(s) (block 1012), the processor 102 identifies the position of the device housing 158 as in a transitional position (block 1016). In some examples, the transitional position is any position other than the first position or the second position. After identifying the position of the device housing 158 as the first position (block 1010), the second position (block 1014), or the transitional position (block 1016), the example method 1000 ends.

From the foregoing, it will be appreciated that example methods and devices disclosed herein may be used to reduce a size and/or weight of a mobile electronic device while providing position-detection features for a housing of the mobile electronic device. In particular, example methods and devices disclosed herein enable omission of dedicated position detection components such as Hall effect sensors and/or dedicated magnetic elements, which add cost and weight to mobile devices that implement such components. Additionally, example methods and devices disclosed herein include position detectors that also provide information related to magnetic field measurements to mobile electronic device applications, such as electronic compass applications. Example methods and devices disclosed herein also enable faster reactions to changes in housing position by measuring transitional magnetic fields and identifying changes in housing position based on the transitional magnetic fields.

Finally, although certain example methods and devices have been described herein, the scope of coverage of this disclosure is not limited thereto. On the contrary, this disclosure covers all methods and devices fairly falling within the scope of the appended claims either literally or under the doctrine of equivalents.

What is claimed is:

1. A device, comprising:
a housing having a first portion movably coupled to a second portion, the second portion to have a first position, a second position, and at least one intermediate position relative to the first portion, wherein the intermediate position is between the first and second positions;
a three-axis magnetometer in the first portion, the three-axis magnetometer configured to measure a transitional magnetic field when the second portion is in the intermediate position, configured to measure a second magnetic field, and configured to generate a measured magnetic field vector for an application executed by the device; and
a processor configured to:
determine that the second portion is in the first position or the second position based on the transitional magnetic field and the second magnetic field;
select a) a first stored magnetic field vector associated with the first position when the second portion is determined to be in the first position, or b) a second stored magnetic field vector associated with the second position when the second portion is determined to be in the second position;
determine a net magnetic field vector by subtracting the selected one of the first stored magnetic field vector or the second stored magnetic field vector from the measured magnetic field vector; and
provide the net magnetic field vector to the application.

2. A device as defined in claim 1, wherein the three-axis magnetometer is to generate a signal representative of a multi-directional measurement of the transitional magnetic field or the second magnetic field.

3. A device as defined in claim 1, wherein the second portion comprises a plurality of components that cause a change in a magnetic field strength measured by the three-axis magnetometer when the second portion is moved relative to the first portion, wherein the processor is configured to determine that the first portion is in the first position or the second position based on the measured magnetic field strength.

4. A device as defined in claim 1, wherein the second magnetic field has a first magnetic field value measured by the three-axis magnetometer when the first and second portions of the housing are closed and a second magnetic field value measured by the three-axis magnetometer when the first and second portions of the housing are open, wherein a measured strength of the third magnetic field value determined by the three-axis magnetometer is greater than a measured strength of the first magnetic field value.

5. A device as defined in claim 1, wherein the first and second portions of the housing are configured in a slider arrangement, a swivel arrangement, or a flip arrangement.

6. A device as defined in claim 1, wherein application is a compass application.

7. A method, comprising:
- measuring a first magnetic field using a three-axis magnetometer;
- identifying a first position of a first portion of a device housing relative to a second portion of the device housing based on the first magnetic field;
- measuring a transitional magnetic field different from the first magnetic field using the three-axis magnetometer;
- identifying a second position of the first portion of the device housing relative to the second portion of the device housing based on the transitional magnetic field;
- obtaining a measured magnetic field vector from the three-axis magnetometer for an application executed by the device;
- selecting a) a first stored magnetic field vector associated with the first position when the second portion is determined to be in the first position, or b) a second stored magnetic field vector associated with the second position when the second position is determined to be in the second position;
- generating a net magnetic field vector by subtracting the selected one of the first stored magnetic field vector or the second stored magnetic field vector from the measured magnetic field vector; and
- providing the net magnetic field vector to the application.

8. A method as defined in claim 7, further comprising measuring a third magnetic field after measuring the transitional magnetic field, wherein identifying the second position is based on a temporal sequence of identifying the transitional magnetic field followed by identifying the third magnetic field.

9. A method as defined in claim 7, wherein the transitional magnetic field corresponds to an intermediate position between the first position and the second position.

10. A method as defined in claim 7, wherein at least one of measuring the first magnetic field or measuring the second magnetic field comprises measuring at least one directional magnetic field.

11. A method as defined in claim 7, further comprising displaying information representative of the measured magnetic field vector via an application.

12. A method as defined in claim 7, wherein the second position is an intermediate position.

13. A method as defined in claim 12, further comprising providing the second position to an application of the device for controlling the application.

14. A device, comprising:
- a housing having a first portion movably coupled to a second portion, the second portion to have a first position, a second position, and intermediate positions relative to the first portion, wherein the intermediate position is between the first and second positions;
- a position detector in the first portion, the position detector being configured to measure a transitional magnetic field when the second portion is in one of the intermediate positions; and
- a processor configured to transform a value representative of the transitional magnetic field into an analog input value to an application based on determining which of the intermediate positions corresponds to the transitional magnetic field by comparing the transitional magnetic field to one of a set of predetermined magnetic fields associated with the intermediate positions.

15. A device as defined in claim 1, wherein the processor is configured to determine the net magnetic field vector by using the measured magnetic field vector as the net magnetic field vector when the second portion is in the intermediate position.

16. A device as defined in claim 1, wherein the transitional magnetic field is a predetermined pattern in the magnetic field indicative of a user moving the second portion from the first position to the second position.

17. A method as defined in claim 7, further comprising calibrating the three-axis magnetometer for determining characteristic magnetic fields of the device housing in the first position and the second position, and determining and storing the first stored magnetic field and the second stored magnetic field based on the characteristic magnetic fields.

18. A method as defined in claim 7, wherein the transitional magnetic field is a predetermined pattern in the magnetic field indicative of a user moving the first portion from the first position to the second position.

* * * * *